United States Patent [19]
Nadooshan

[11] Patent Number: 6,161,182
[45] Date of Patent: Dec. 12, 2000

[54] METHOD AND APPARATUS FOR RESTRICTING OUTBOUND ACCESS TO REMOTE EQUIPMENT

[75] Inventor: Mehrdad Jamei Nadooshan, Fort Lee, N.J.

[73] Assignee: Lucent Technologies Inc., Murray Hill, N.J.

[21] Appl. No.: 09/036,332

[22] Filed: Mar. 6, 1998

[51] Int. Cl.[7] .................................................... G06F 1/26
[52] U.S. Cl. ........................ 713/172; 713/201; 713/168; 380/255
[58] Field of Search ........................... 380/255; 713/201, 713/168, 172, 182, 185

[56] References Cited

U.S. PATENT DOCUMENTS

| 5,636,280 | 6/1997 | Kelly | 380/21 |
| 5,757,916 | 5/1998 | MacDoran et al. | 380/25 |
| 5,892,902 | 4/1999 | Clark | 713/201 |

OTHER PUBLICATIONS

J. Kohl and C. Neuman, "The Kerberos Network Authentication Service (V%)," RFC No. 1510, downloaded from http://www.cis.ohio–state.edu/hypertext/information/rfc.html, (Sep. 1993).

N. Haller, "The S/Key One–Time Password System," RFC No. 1760, downloaded from http://www.cis.ohio–state.edu/hypertext/information/rfc.html, (Feb. 1995).

W. Simpson, PPP Challenge Handshake Authentication Protocol (CHAP), RFC. No. 1994, downloaded from http://www.cis.ohio–state.edu/hypertext/information/rfc.html, (Aug. 1996).

Security Dynamics, Inc., "Existing Strong Authentication Technologies," (date unknown).

"Digital Certificates and Strong Authentication," downloaded from http://www.sirrus.com/web_security_at. html (1997).

Primary Examiner—Thomas R. Peeso
Attorney, Agent, or Firm—Ryan, Mason & Lewis, LLP

[57] ABSTRACT

A centralized token generating server is disclosed for limiting access to remote equipment. The token generating server provides outgoing authentication of a user, before permitting the user to leave the network environment to access remote equipment. The token generating server generates responses (tokens) for authorized users to satisfy challenges posed by remote equipment and maintains a log of all processed transactions. The token generating server provides an initial outbound access control, whenever a user desires to leave the network environment to access remote equipment, and the remote equipment performs a secondary authorization to ensure that a given user can access the given remote equipment. Each attempt by a user to obtain token-regulated access to remote equipment requires two token management sessions. During a token acquisition process, the user establishes a first session with the token generating server to obtain an access token to obtain access to a given piece of remote equipment. The initial session terminates once the token is acquired and the user accesses the remote equipment. Once the user has completed accessing the remote equipment, a second session is established between the user and the token generating server to terminate the session. An access transaction is complete when the active session is terminated and the token generating server is notified.

36 Claims, 10 Drawing Sheets

METHOD AND APPARATUS FOR RESTRICTING OUTBOUND ACCESS TO REMOTE EQUIPMENT

FIELD OF THE INVENTION

The present invention relates to network security techniques, and more particularly, to a method and apparatus for centralizing access control to remote equipment.

BACKGROUND OF THE INVENTION

The connection of computers and other equipment to networks permits easy and flexible access to the equipment by distributed users, provides efficient utilization of shared resources, and permits the equipment to be serviced from a centralized source. The ability to access equipment over a network, however, presents a number of security issues. Computers and other equipment often contain proprietary and/or sensitive information, which, if known to, or altered by, the competitors or customers of the owner of the equipment, could dramatically prejudice the owner. Thus, most networked equipment incorporate computer security techniques, such as database access control mechanisms, to prevent unauthorized users from accessing, obtaining or altering the proprietary and/or sensitive information stored on the equipment. In this manner, the integrity and confidentiality of the information can be maintained in the potentially hostile computing environment.

Authentication techniques allow remote users to prove their identity and obtain authorized access to remote equipment. A number of authentication protocols have been proposed or suggested to inhibit the unauthorized and illegal access of remote equipment. In one variation, a user has an associated alphanumeric personal identification number (PIN) or password, that is presumably known only to the authorized user. Upon accessing the remote equipment, the user provides the equipment with the appropriate password, to establish the authority of the user. Many users select a PIN or password that is easy to remember. Thus, there is a significant risk that such passwords may be guessed or otherwise compromised.

Recently, strong authentication tools, such as the Access Security Gateway Lock (ASG Lock™), commercially available from the Business Communication Systems group of Lucent Technologies, Inc., of Basking Ridge, N.J., have been deployed in environments where large-scale remote access to remote equipment is required. Users of a remote device protected by an Access Security Gateway are assigned a secret key, presumably known only to the user and the remote device. The secret key may be stored, for example, on a pocket token or a computer-readable card. Upon attempting to access a desired remote device, the Access Security Gateway issues a random value, known as a "challenge," to the user. The user then generates an appropriate "response" to the challenge by encrypting the received challenge with the user's secret key (read from the pocket token or computer-readable card), using a known encryption algorithm, such as the data encryption standard (DES). The user transmits the calculated response to the desired remote device, and obtains access to the requested resources provided the response is accurate. In order to ensure that the pocket token or computer-readable card is being utilized by the associated authorized user, the user typically must also manually enter a secret alphanumeric PIN or password.

While such strong authentication tools have effectively reduced the unauthorized and illegal accessing of remote equipment, they suffer from a number of limitations, which if overcome, could dramatically increase the utility and effectiveness of such tools. For example, the requirement that the user must manually enter a PIN or password to ensure that the pocket token or computer-readable card is being utilized by the associated authorized user, requires the presence of a human user. Thus, such strong authentication tools cannot be utilized by expert tools to access remote equipment, without human intervention. In addition, current authentication systems do not perform an outbound access control to determine if users are authorized to leave the network environment to access remote equipment, regardless of whether they are authorized to access the remote equipment.

As apparent from the above-described deficiencies with conventional techniques for restricting access to remote equipment, a need exists for a centralized authentication system that securely generates one-time tokens to satisfy challenges posed by remote systems. Furthermore, a need exists for an authentication system that logs session records of all processed transactions to establish user accountability. Yet another need exists for a strong authentication tool that provides centralized outbound access control from a network to remote equipment. In addition, a need exists for an authentication system that allows automation at the expert system level.

SUMMARY OF THE INVENTION

Generally, a centralized token generating server is disclosed for limiting access to remote equipment. According to one aspect of the invention, the token generating server provides outgoing authentication of a client (acting on behalf of a human user or an expert tool), before permitting the client to leave the network environment to access remote equipment. The token generating server generates responses (tokens) for authorized clients to satisfy challenges posed by remote equipment and maintains a log of all processed transactions. Initially, the token generating server provides outbound access control, whenever a client desires to leave the network environment to access remote equipment. In addition, secondary authorization is performed at the remote equipment to ensure that a given client can access the given remote equipment. The clients may access the remote equipment for diagnostic, testing, system upgrade or other service-oriented purposes, or to obtain access to one or more resources, such as files or services, provided by the remote equipment.

According to a further aspect of the invention, each attempt by a client to obtain token-regulated access to remote equipment generally requires two token management transactions. Generally, during a token acquisition process, the client establishes a first transaction with the token generating server to obtain an access token to obtain access to a given piece of remote equipment. The initial transaction terminates once the token is acquired and the client accesses the remote equipment. Once the client has completed accessing the remote equipment, a second transaction is established between the client and the token generating server to terminate the session. Thus, an access session is complete only if the active session is terminated and the token generating server is notified.

Prior to establishing a token acquisition session with the token generating server, the client initially attempts to establish a connection with the remote equipment, on behalf of a human user or an automated expert tool. The Access Security Gateway of the respective remote equipment then challenges the client. The client obtains a one-time token, which is the appropriate response to the challenge, by sending a token request message to the token generating server. Before issuing a token to the client, the token generating server performs an outbound authentication to verify the authenticity of the client by means of a challenge. The client responds to the token generating server with the response computed by the client to the challenge.

Thereafter, once verified, the token generating server transmits an access token (equipment response) to the client. The client then transmits the response to the respective desired remote equipment, upon which the respective remote equipment accepts the login and permits the client to access the remote equipment for the stated purpose. When the human user or expert tool indicates that the session is complete, an indication is provided to the remote equipment and the remote equipment acknowledges the termination. In addition, the client transmits a session termination message to the token generating server, containing an authentication value (the encrypted previous client response creating a new response), a session identifier, a termination status (normal or abnormal) and an optional user log message that permits the client to record a message in the session log. Finally, the token generating server transmits an acknowledgement of termination of the session to the client.

A more complete understanding of the present invention, as well as further features and advantages of the present invention, will be obtained by reference to the following detailed description and drawings.

DETAILED DESCRIPTION

Figure 1:
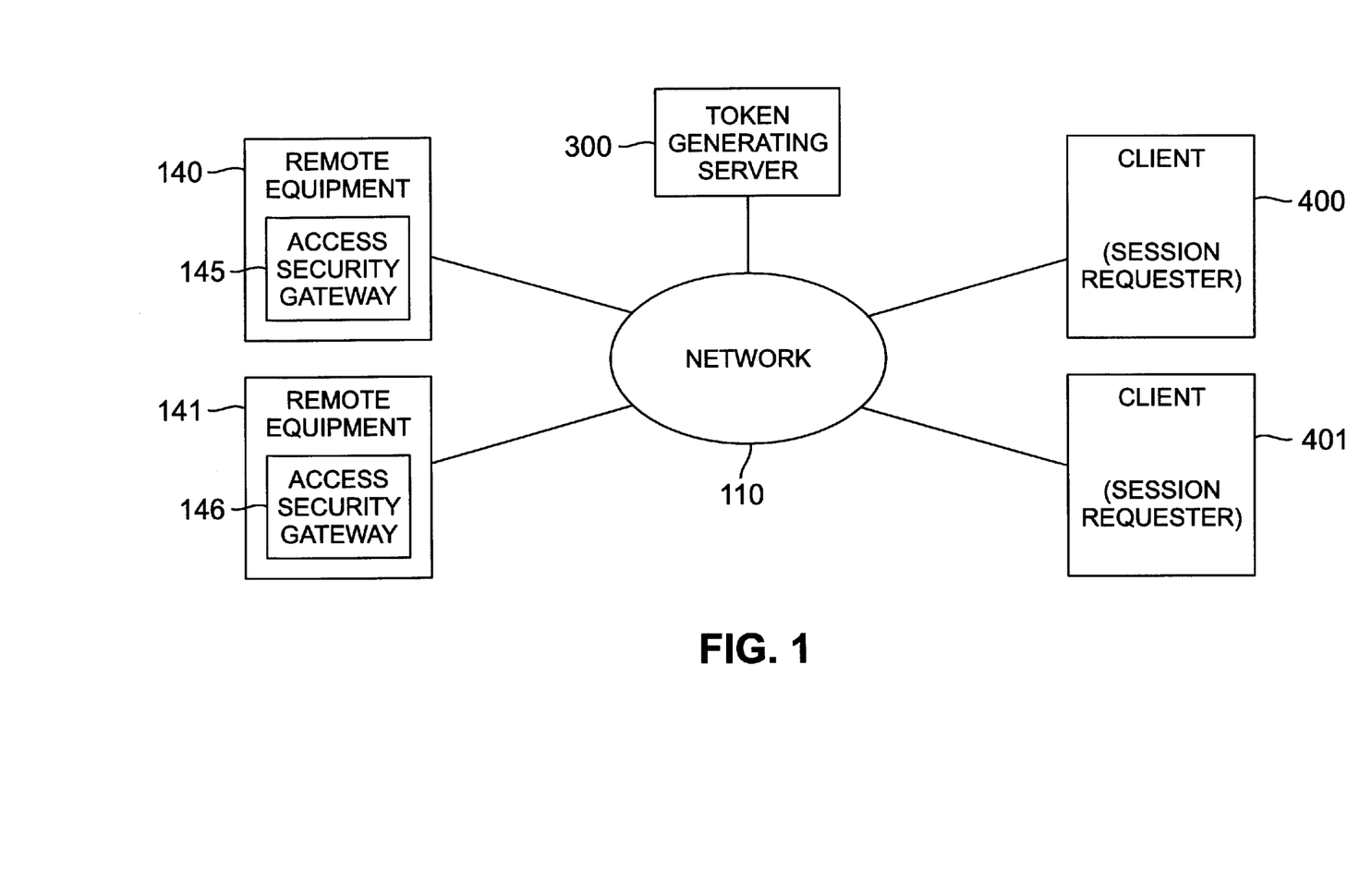
FIG. 1 is a schematic block diagram illustrating a token generating server in accordance with one embodiment of the present invention.
Figure 3:
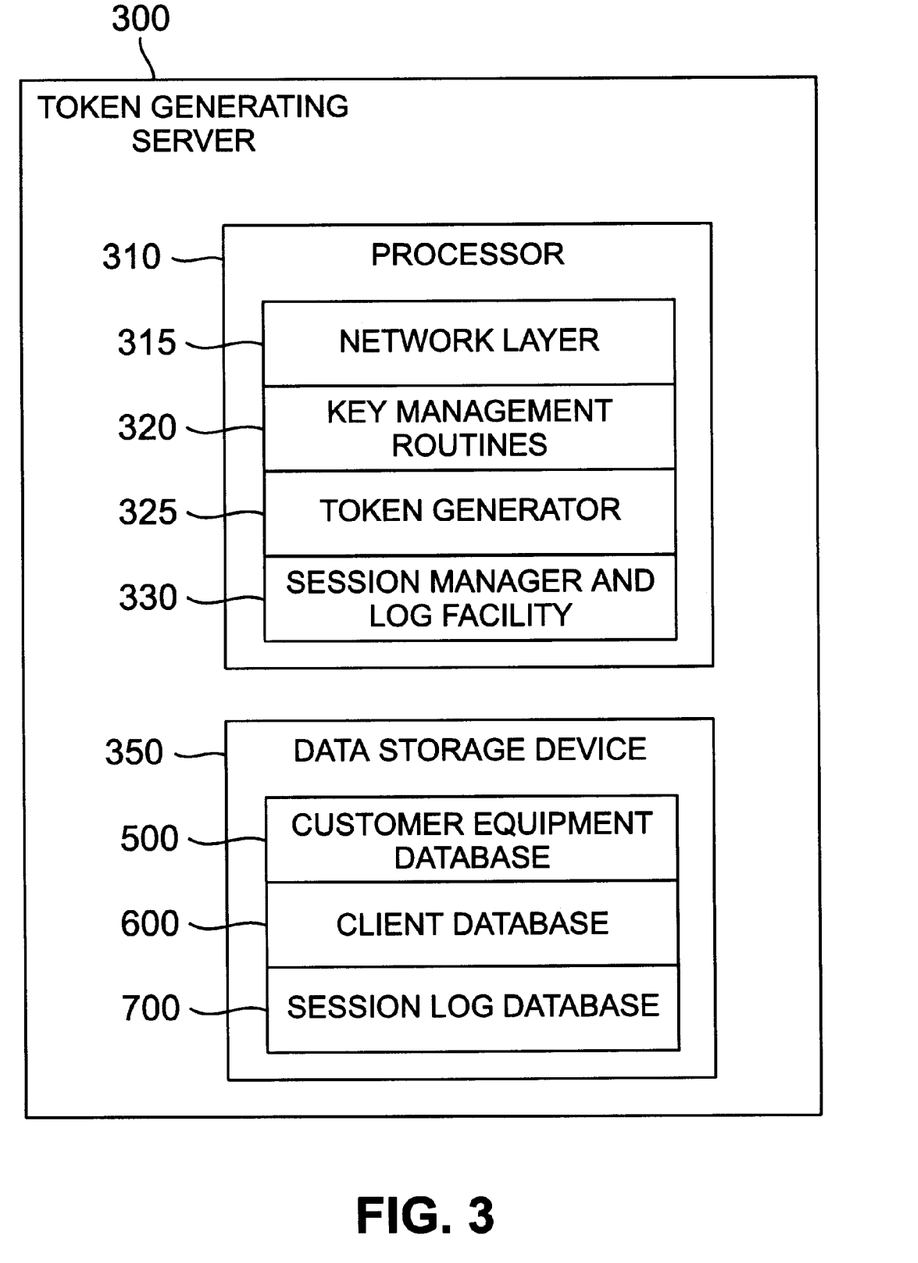
FIG. 3 is a schematic block diagram of the exemplary token generating server of FIG. 1.

FIG. 1 shows an illustrative network environment 110 for interconnecting one or more clients 400-401, discussed further below in conjunction with FIG. 4, with remote equipment 140-141. According to a feature of the present invention, the token generating server 300, discussed further below in conjunction with FIG. 3, provides outgoing authentication of a client 400-401, before permitting the client 400-401 to leave the network environment 110 to access remote equipment, over one or more networks 110. Generally, the token generating server 300 (i) provides access control by securely generating responses (tokens) for authorized clients 400-401 to satisfy challenges posed by the remote equipment 140-141 and (ii) maintains session log records of all processed transactions to establish user accountability. Thus, the token generating server 300 provides outbound access control, whenever a client 400-401 desires to leave the network environment 110 to access remote equipment 140-141, as well secondary authorization at the remote equipment 140-141 to ensure that a given human user can access the given remote equipment 140-141.

In one embodiment, the clients 400-401 may access the remote equipment 140-141 for diagnostic, testing, system upgrade or other service-oriented purposes. In an alternate embodiment, the clients 400-401 may access the remote equipment 140-141 to obtain access to one or more resources, such as files or services, provided by the remote equipment 140-141. Thus, the token generating server 300 may be maintained, for example, by a remote service provider, such as Lucent Technologies Inc., to control service-oriented access by its technicians to remote equipment 140-141, or by an Internet Service Provider (ISP) to control resource accesses by its customers to remote equipment 140-141.

Figure 2:
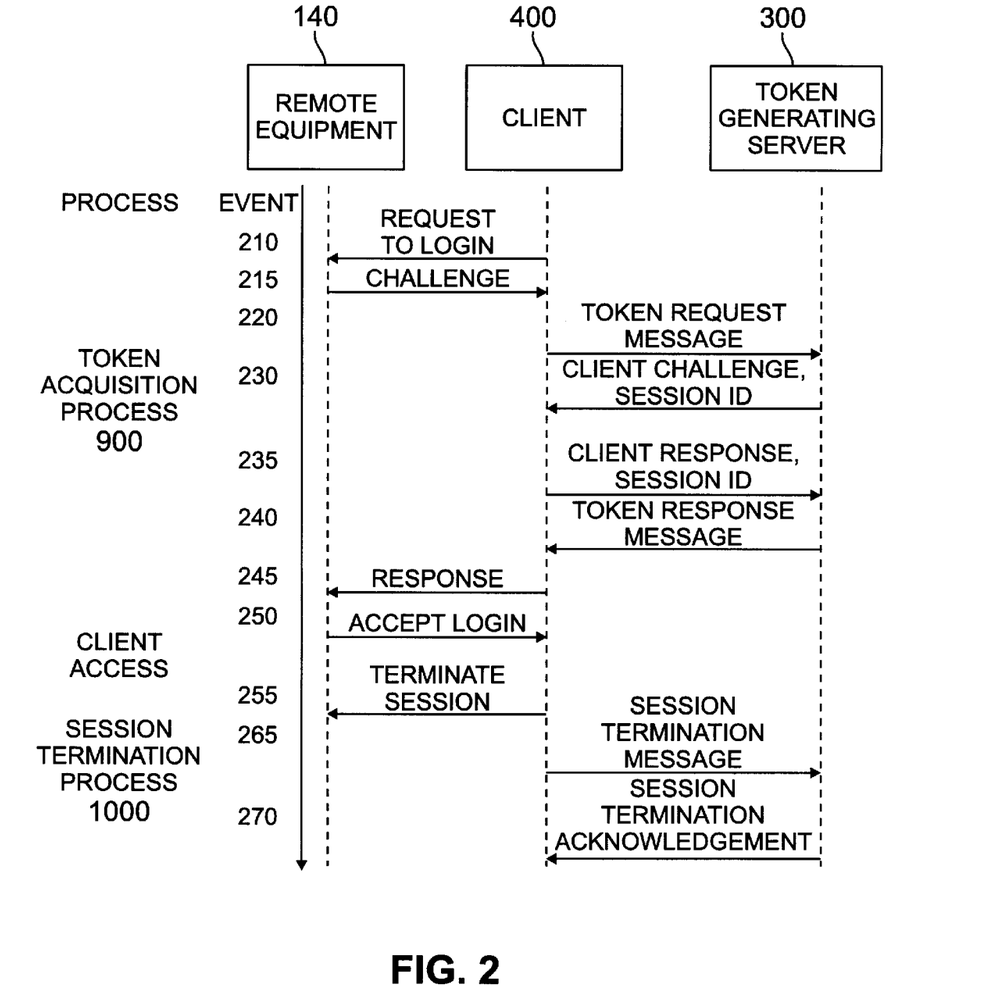
FIG. 2 illustrates the various communication sessions between the client, remote equipment and token generating server of FIG. 2 during a client access transaction.

The network environment 100 may be embodied, for example, as the Public Switched Telephone Network ("PSTN"), the Internet, or other communication networks, as would be apparent to a person of ordinary skill. The remote equipment 140-141 may be embodied, for example, as a customer-premises telecommunications switch, such as a Private Branch Exchange (PBX) switch, or a computing device, such as a workstation or a file server. As shown in FIG. 1, each remote equipment 140-141 may include an access security gateway to provide access control, such as the Access Security Gateway Lock (ASG Lock™), commercially available from Lucent Technologies Inc., of Basking Ridge, N.J. As shown in FIG. 2, each attempt by a client 400 to obtain token-regulated access to remote equipment 140-141 in accordance with the present invention, hereinafter referred to as an access session, generally requires two token management transactions, namely, a token acquisition process 900 and a session termination process 1000, discussed further below in conjunction with FIGS. 9 and 10, respectively. Generally, during the token acquisition process 900, the client establishes a first transaction with the token generating server 300 to obtain an access token to a given piece of remote equipment 140. Once the token is acquired and the client 400 accesses the remote equipment 140-141, the initial transaction terminates. Once the client has completed accessing the remote equipment 140-141, a second transaction is established between the client 400 and the token generating server 300 to terminate the session. Thus, an access session is complete only if the active session is terminated and the token generating server 300 is notified.

As shown in FIG. 2, prior to establishing a token acquisition session with the token generating server 300, the client 400 initially attempts to establish a connection with the remote equipment 140 during event 210, on behalf of a human user or an automated expert tool. The Access Security Gateway 145 of the respective remote equipment 140-

141 then challenges the client 400 during event 215, in a known manner. The client 400 then attempts to obtain a one-time token, which is the appropriate response to the challenge, by sending a token request message to the token generating server 300 during event 220 to establish a token acquisition transaction. The token request message includes an identifier of the remote equipment 140-141 to be accessed, an identifier of the human user or an automated expert tool, an identifier of the client 400, an indication of the reason for the access, and the challenge received from the remote equipment 140.

Before issuing a token to the client 400 to access the remote equipment 140, the token generating server 300 verifies the authenticity of the client 400 by means of a challenge. Thus, the token generating server 300 transmits a client authentication message to the client 400 during event 230 to establish the authenticity of a client 400 for a given session. The client 400 responds to the token generating server 300 during step 235 with a client response message containing the response computed by the client 400 to the challenge and a session identifier.

Thereafter, once verified, the token generating server 300 transmits a token response message to the client during event 240, containing the access token (equipment response) and the session identifier. The client 400 then transmits the response to the respective remote equipment 140-141 during event 245, upon which the respective remote equipment 140-141 accepts the login during event 250 and permits the client 400 to access the remote equipment 140-141 for the stated purpose.

When the human user or expert tool terminates the session with the remote equipment 140-141 during event 255 (typically in the form of logging off the remote system), the client 400 transmits a session termination message to the token generating server 300 during event 265. The session termination message contains an authentication value (the encrypted previous client response creating a new client response), the session identifier, a termination status (normal or abnormal) and an optional client log message that permits the client 400 to record a message in the session log 700, discussed below. Finally, the token generating server 300 transmits an acknowledgement of termination of the session to the client 400 during event 270.

FIG. 3 is a block diagram showing the architecture of an illustrative token generating server 300. The token generating server 300 preferably includes a processor 310 and related memory, such as a data storage device 350. The processor 310 may be embodied as a single processor, or a number of processors operating in parallel. The data storage device 350 or other memory is operable to store one or more instructions, which the processor 310 is operable to retrieve, interpret and execute.

As shown in FIG. 3 and discussed herein, the processor 310 preferably implements a networking layer 315 to coordinate the message protocol discussed above in conjunction with FIG. 2, and one or more known key management routines 320 to securely generate, distribute and manage client keys and to ensure continuity of service if a key is exposed, corrupted or otherwise not properly distributed. In addition, the processor 310 includes a token generator 325 to implement the processes described below in conjunction with FIGS. 9 through 11, to provide access control by securely generating responses (tokens) for authorized clients 400-401 to satisfy challenges posed by the remote equipment 140-141. A session manager and log facility 330 maintains session log records of all processed transactions to establish user accountability.

As discussed further below in conjunction with exemplary data provided in FIGS. 5 through 7, respectively, the data storage device 350 includes a remote equipment database 500, a client database 600 and a session log database 700. The remote equipment database 500 stores information on each piece of remote equipment 140-141. The client database 600 stores information on each client 400. The session log database 700 stores information on all access transactions processed by the token generating server 300.

Figure 4:
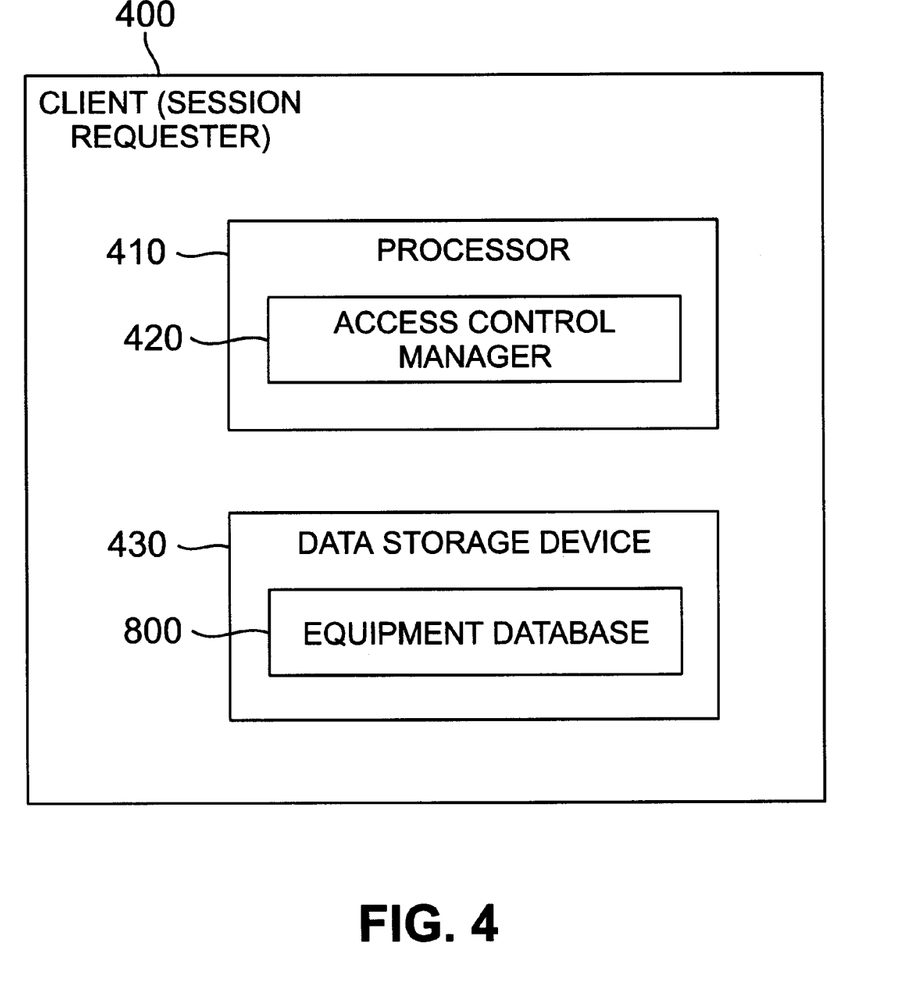
FIG. 4 is a schematic block diagram of the exemplary client of FIG. 1.

FIG. 4 is a block diagram showing the architecture of an illustrative client 400. The client 400 preferably includes a processor 410 and related memory, such as a data storage device 430. Each of these components 410, 430 may function identically to those corresponding components described above in conjunction with FIG. 3. The processor 410 includes an access control manager 420 to implement the processes described below in conjunction with FIGS. 9 through 11, to provide access control to obtain responses (tokens) from the token generating server 300 to satisfy challenges posed by the remote equipment 140-141. As discussed further below in conjunction with exemplary data provided in FIG. 8, the data storage device 430 includes an equipment database 800. The equipment database 800 stores information on the remote equipment 140-141 that the client 400 may access.

DATABASES

Figure 5:
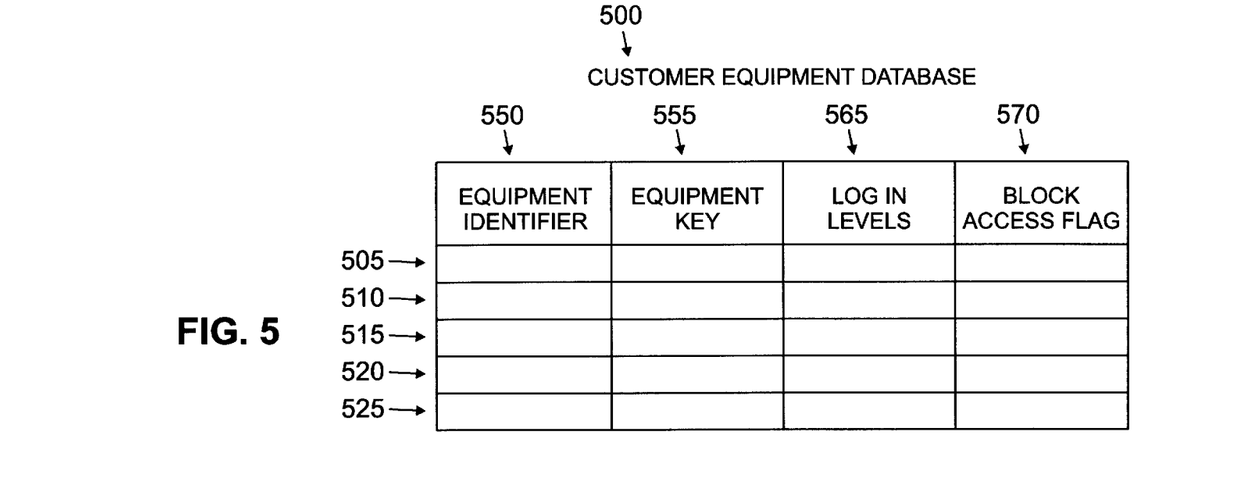
FIG. 5 illustrates a sample table from the remote equipment database of FIG. 3.

FIG. 5 illustrates the remote equipment database 500 that stores information on each piece of remote equipment 140-141. The remote equipment database 500 maintains a plurality of records, such as records 505-525, each corresponding to a different piece of remote equipment 140-141. For each piece of remote equipment 140-141 identified by an equipment identifier in field 550, the remote equipment database 500 includes a corresponding equipment key in field 555. As discussed further below, the token generating server 300 encrypts the equipment key 555 using the challenge issued by the remote equipment 140-141, to generate an appropriate one-time access token for an authorized client 400. In addition, for each piece of remote equipment 140-141, the remote equipment database 500 records the associated login level and block access flag in fields 565 and 570, respectively. The login level may be, for example, powerful, medium or limited access. The block access flag allows equipment to be selectively taken out of service.

Figure 6:
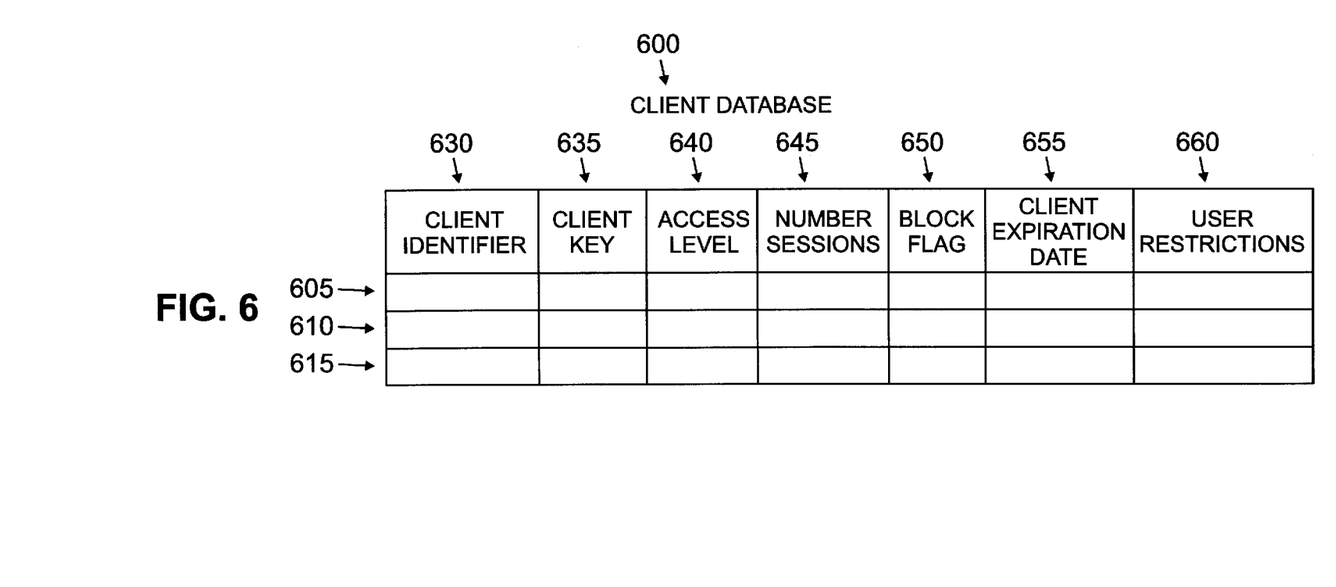
FIG. 6 illustrates a sample table from the client database of FIG. 3.

FIG. 6 illustrates the client database 600 that stores information on each client 400. The client database 600 maintains a plurality of records, such as records 605-615, each corresponding to a different client 400-401. For each client identified by a client identifier in field 630, the client database 600 includes the client's current secret key in field 635. In addition, the client database 600 records the client's associated access level, maximum number of sessions, block access flag, and any user restrictions, such as day of week and time of day restrictions, in fields 640 through 660, respectively. The block access flag allows clients to be selectively blocked, even if normally authorized.

Figure 7:
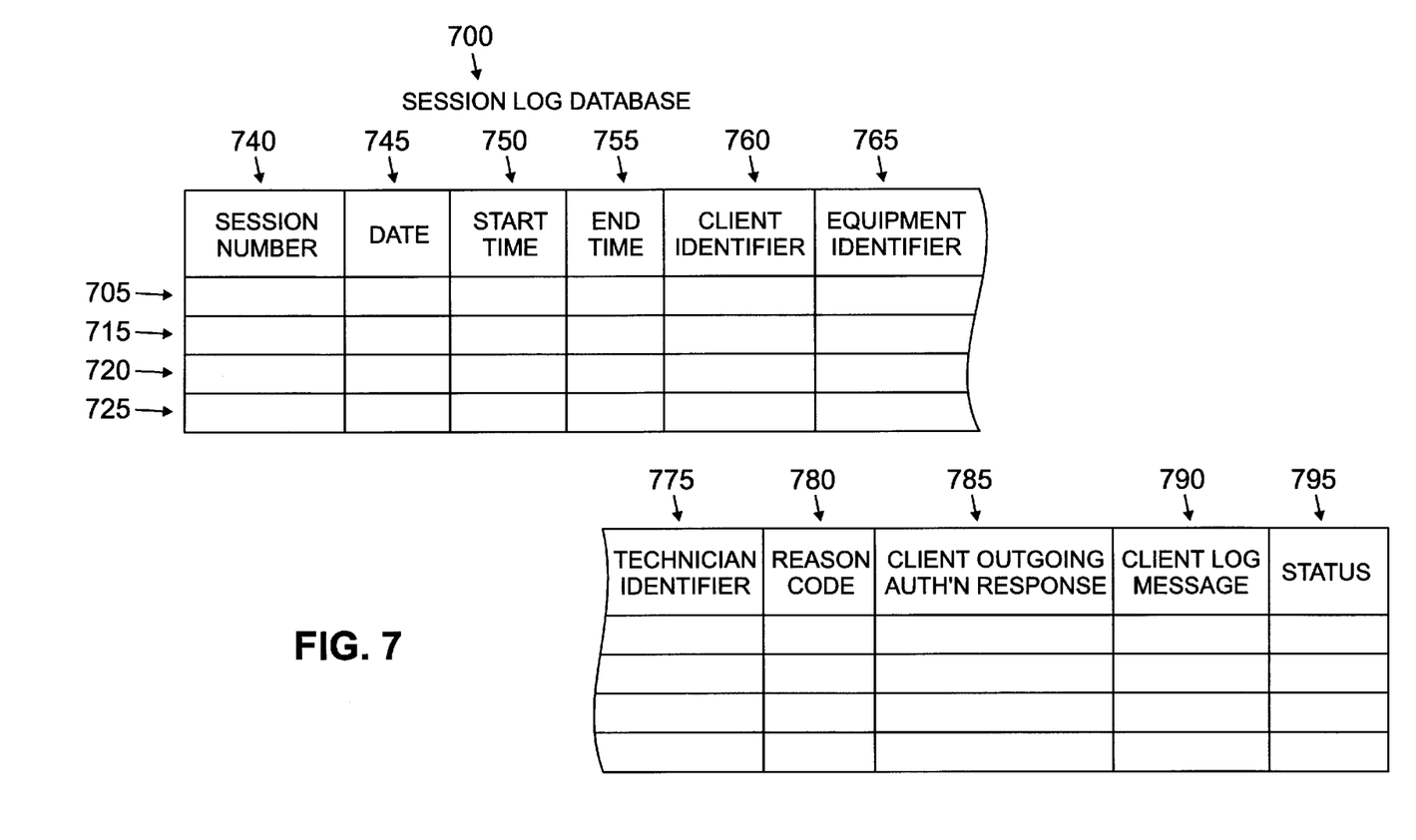
FIG. 7 illustrates a sample table from the session log database of FIG. 3.

FIG. 7 illustrates the session log database 700 that stores information on all access transactions processed by the token generating server 300, including an identification of the client and equipment, the reason for the access and what was obtained. The session log database 700 maintains a plurality of records, such as records 705-725, each corresponding to a different access transaction. For each transaction identified by a session identifier in field 740, the session log database 700 includes the session date, and start and end times in fields 745 through 755, respectively. In addition, the session log database 700 includes an identifier of the client, equipment and technician (human user or expert tool), as well as an optional reason code, associated with the session in fields 760 and 780, respectively. The session log database 700 records the client authentication response from event 240 (FIG. 2) in field 785, to provide authentication for the session termination. As indicated above, the session termination message transmitted by the client to the token generating server 300 during event 265 (FIG. 2), contains the encrypted client response (to create a new client response), the session identifier, a termination status (normal or abnormal) and an optional client log message that permits the client 400 to record a message in the session log 700. By using the client authentication response as a challenge for the termination, the transaction is tied back to the authorized client. The termination status (normal or abnormal) and the optional client log message are recorded in fields 795 and 790, respectively, of the session log database 700.

Figure 8:
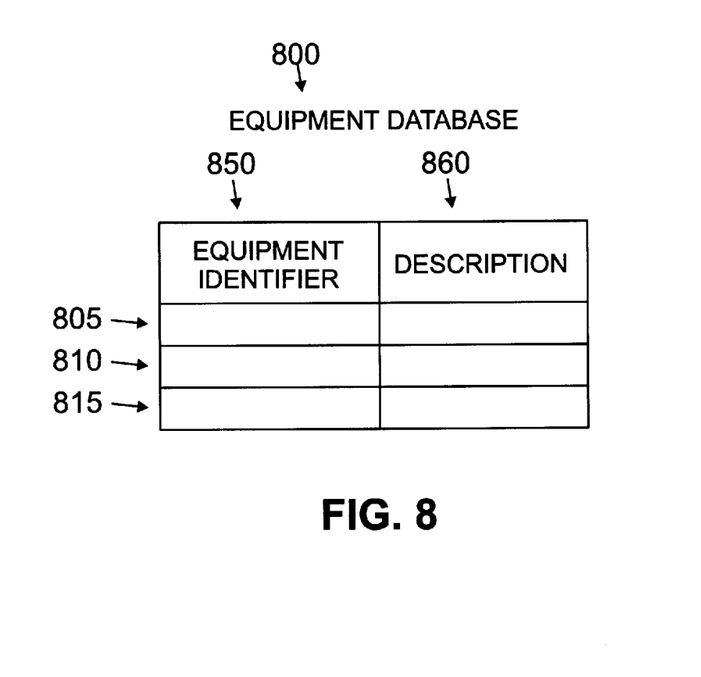
FIG. 8 illustrates a sample table from the equipment database of FIG. 3.

FIG. 8 illustrates the equipment database 800 maintained by each client to record information on each remote equipment 140-141. The equipment database 800 maintains a plurality of records, such as records 805-815, each corresponding to a different piece of remote equipment 140-141. For each piece of remote equipment 140-141 identified by an equipment identifier in field 850, the equipment database 800 includes an appropriate description of the equipment 140-141 in field 860.

PROCESSES

As discussed above in conjunction with FIG. 2, each attempt by a client 400 to obtain token-regulated access to remote equipment 140-141 in accordance with the present invention, requires two token management sessions, namely, a token acquisition process 900 and a session termination process 1000, discussed further below in conjunction with FIGS. 9 and 10, respectively. The client establishes a first session with the token generating server 300 during the token acquisition process 900 to obtain an access token to a given piece of remote equipment 140 and thereby obtain access to the remote equipment 140-141. Once the client has completed accessing the remote equipment 140-141, a second session is established between the client 400 and the token generating server 300 to terminate the session in accordance with the session termination process 1000.

Figure 9:
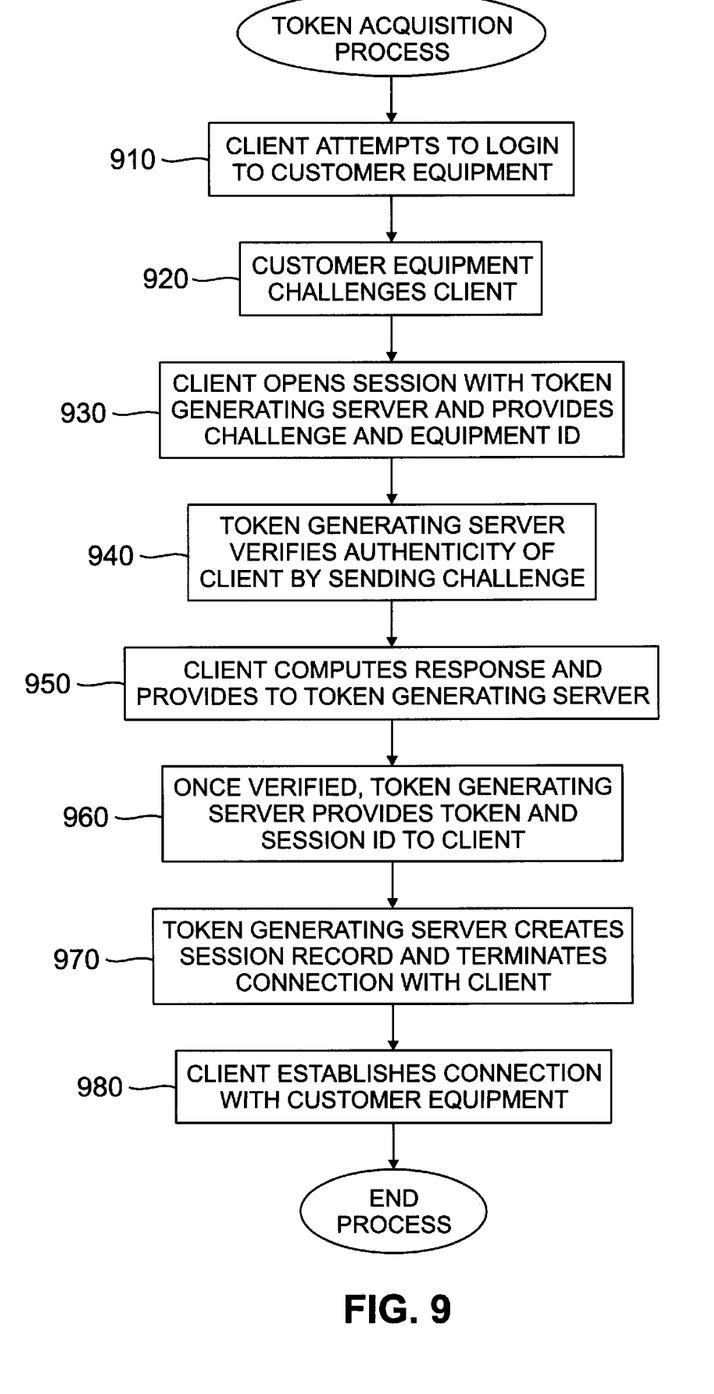
FIG. 9 is a flow chart describing an exemplary token acquisition process of FIG. 2.

As shown in FIG. 9, during the token acquisition process 900, the client initially attempts to log into remote equipment during step 910. Thereafter, the remote equipment challenges the client 400 during step 920. In order to obtain an appropriate access token, the client 400 opens a session with the token generating server 300 during step 930 and provides the token generating server 300 with the challenge received from the remote equipment 140-141 and an identifier of the remote equipment 140-141. According to a feature of the present invention, the token generating server 300 verifies the authenticity of the client 400 by sending a challenge to the client during step 940.

The client 400 then computes an appropriate response to the challenge during step 950 and provides the response to the token generating server 300. The client 400 computes the response, for example, by encrypting the client's secret key with the challenge using the data encryption standard (DES), as shown in FIG. 11B. Once the token generating server 300 has verified the accuracy of the response transmitted by the client 400, in accordance with the challenge/response process 1100, shown in FIG. 11A, discussed below, the token generating server 300 provides the appropriate token, and an identifier of the session to the client 400 during step 960. The token generating server 300 generates the appropriate token by encrypting the equipment key 555 with the challenge issued by the remote equipment 140-141. Thereafter, during step 970, the token generating server 300 creates a session record in the session log database 700 and terminates the connection with the client 400. The client 400 then uses the token provided during step 960 to obtain access to the desired remote equipment 140-141 during step 980, before program control terminates. Thus, the processing steps set forth in FIG. 9 correspond to events 210 through 250 of FIG. 2.

Figure 10:
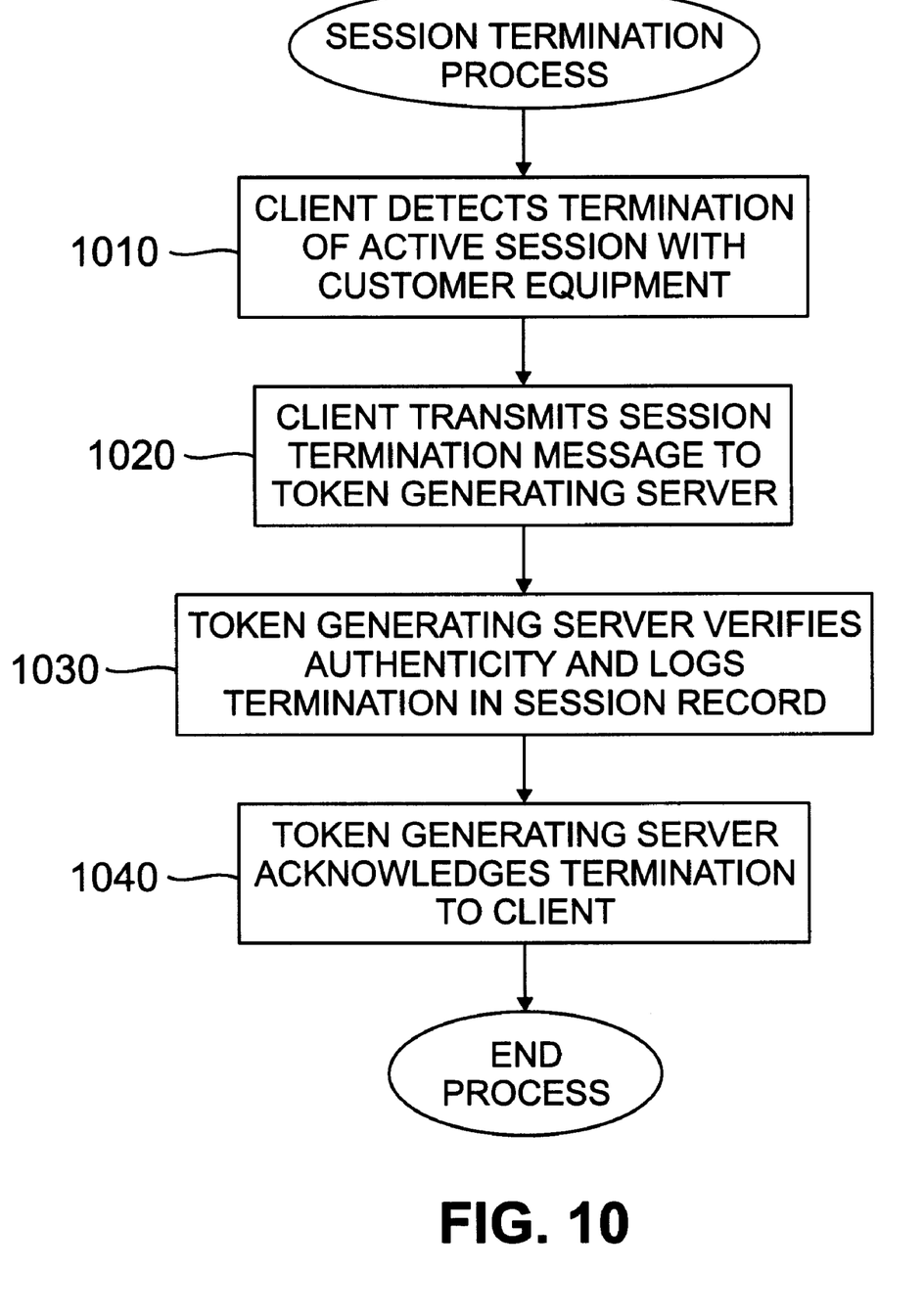
FIG. 10 is a flow chart describing an exemplary session termination process of FIG. 2.

As previously indicated, once the client has finished accessing the remote equipment 140-141, the client 400 accesses the token generating server 300 to terminate the session in accordance with the session termination process 1000, shown in FIG. 10. When the human user or expert tool indicates that the session is complete, the client 400 detects the termination during step 1010 and transmits a session termination message to the token generating server 300 during step 1020. The session termination message contains the encrypted client response (to create a new client response), the session identifier, a termination status (normal or abnormal) and an optional client log message that permits the client 400 to record a message in the session log 700. The token generating server 300 utilizes the encrypted client response to verify the authenticity of the client 400 during step 1030 and then logs the received information in the session log database 700 in the appropriate record identified by the session identifier. Finally, the token generating server 300 transmits an acknowledgement of termination of the session to the client 400 during step 1040, before program control terminates.

Figure 11A:
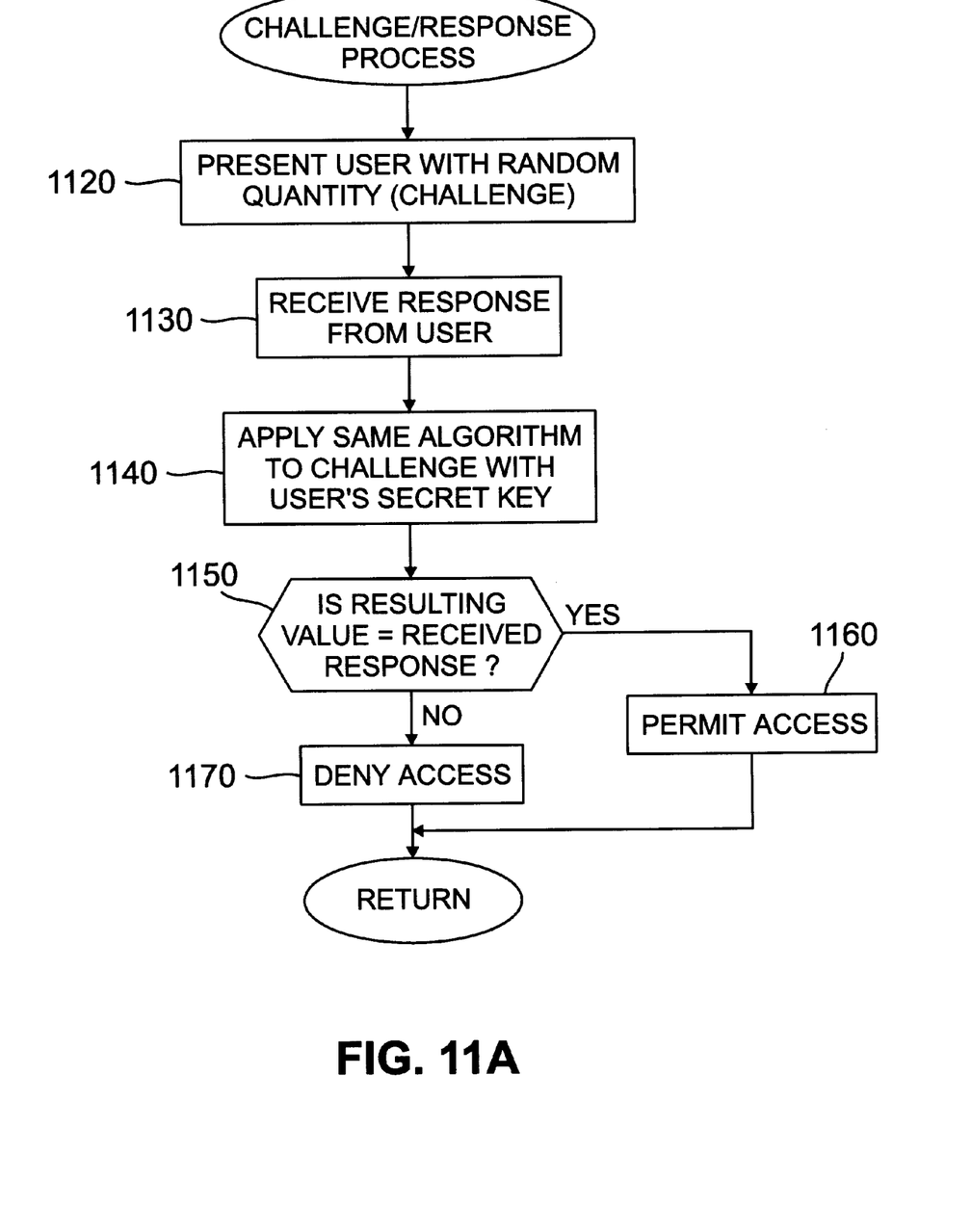
FIG. 11A is a flow chart describing an exemplary challenge/response process implemented by the token acquisition process of FIG. 9.
Figure 11B:
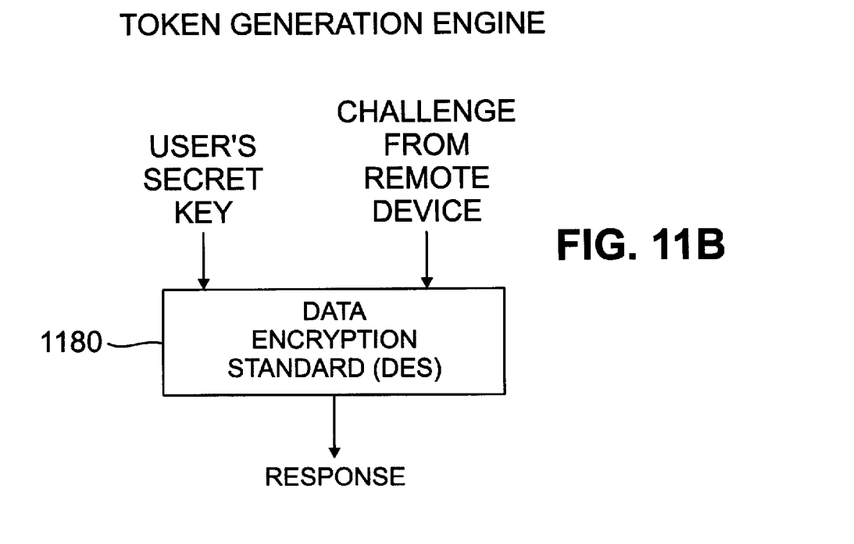
FIG. 11B is a schematic block diagram illustrating the data encryption standard (DES) used by the challenge/response process of FIG. 11A to generate an appropriate response to a challenge.

As previously indicated, the token generating server 300 executes the challenge/response process 1100, shown in FIG. 11A, to verify the accuracy of the response transmitted by the client 400. Thus, the challenge/response process 1100 initially presents the client 400 with a random value, known as the challenge, during step 1120. The client 400 then transmits a response to the token generating server 300 during step 1130. The client 400 generates the response by encrypting the challenge with the client's secret key. The token generating server 300 then independently calculates the response during step 1140 by applying the same algorithm, such as the DES algorithm, to the challenge with the client's key.

A test is then performed during step 1150 to determine if the response calculated by the token generating server 300 is the same as the response received from the client 400. If it is determined during step 1150 that the response is accurate, then the client is permitted access during step 1160, before program control terminates. If, however, it is determined during step 1150 that the response is not accurate, then the client is denied access during step 1170, before program control terminates.

FIG. 11B is a schematic block diagram of the illustrative data encryption standard (DES) 1180 used by the client 400 and token generating server 300 to generate an appropriate response to a challenge from a remote equipment 140-141. The response is generated by encrypting the challenge with the client's secret key, using the DES standard.

It is to be understood that the embodiments and variations shown and described herein are merely illustrative of the principles of this invention and that various modifications may be implemented by those skilled in the art without departing from the scope and spirit of the invention.

I claim:

1. A method of accessing a remote device on a communications network, said method comprising the steps of:

receiving a first challenge from the remote device;

transmitting the first challenge to a centralized token generator;

receiving a second challenge from the centralized token generator for access control;

transmitting a response to the second challenge to the centralized token generator;

obtaining a token for accessing the remote device if the response to the second challenge is correct;

transmitting the token to the remote device as a response to the first challenge; and obtaining access to the remote device if the response to the first challenge is correct.

2. The access control method according to claim 1, wherein the first challenge is a random number, the remote device has an associated secret key, and the response to the first challenge is calculated by encrypting said first challenge with the key of said remote device.

3. The access control method according to claim 1, wherein the second challenge is a random number, the user has an associated secret key, and the response to the second challenge is calculated by encrypting said second challenge with the key of said user.

4. The access control method according to claim 1, wherein said token generator is a centralized outbound device.

5. The access control method according to claim 1, further comprising the step of creating a log entry identifying said access to said remote device.

6. The access control method according to claim 1, further comprising the step of notifying said token generator when said access to said remote device has terminated.

7. The access control method according to claim 6, further comprising the step of authenticating said user upon notifying said token generator of said termination.

8. The access control method according to claim 5, wherein said log entry identifies said user and said remote device.

9. The access control method according to claim 5, wherein said log entry identifies the reason for said access to said remote device.

10. The access control method according to claim 5, wherein said log entry identifies the duration of said access to said remote device.

11. A method of restricting access to a remote device on a communications network, said method comprising the steps of:

receiving a first challenge issued by the remote device from a remote user attempting to access said remote device;

transmitting a second challenge to the remote user for access control;

receiving a response to the second challenge from the remote user; and transmitting a token to the remote user if the response to the second challenge is correct, said token being used as a response to the first challenge to obtain access to the remote device.

12. The access control method according to claim 11, wherein the first challenge is a random number, the remote device has an associated secret key, and the response to the first challenge is calculated by encrypting said first challenge with the key of said remote device.

13. The access control method according to claim 11, wherein the second challenge is a random number, the user has an associated secret key, and the response to the second challenge is calculated by encrypting said second challenge with the key of said user.

14. The access control method according to claim 11, wherein said method is performed by a centralized outbound token generator.

15. The access control method according to claim 11, further comprising the step of creating a log entry identifying said access to said remote device.

16. The access control method according to claim 15, wherein said log entry identifies said user and said remote device.

17. The access control method according to claim 15, wherein said log entry identifies the reason for said access to said remote device.

18. The access control method according to claim 15, wherein said log entry identifies the duration of said access to said remote device.

19. The access control method according to claim 11, further comprising the step of receiving a notification when said access to said remote device has terminated.

20. The access control method according to claim 19, further comprising the step of authenticating said user upon receiving said notification of said termination.

21. A user method for accessing a remote device on a communications network, said method comprising the steps of:

receiving a challenge from the remote device;

transmitting the challenge to a centralized token generator;

obtaining a token for accessing the remote device from the centralized token generator if the centralized token generator authenticates said user;

transmitting the token to the remote device as a response to the challenge; and obtaining access to the remote device if the response to the challenge is correct.

22. The access control method according to claim 21, wherein the challenge is a random number, the remote device has an associated secret key, and the response to the challenge is calculated by encrypting said challenge with the key of said remote device.

23. The access control method according to claim 21, further comprising the step of creating a log entry identifying said access to said remote device.

24. The access control method according to claim 21, further comprising the step of notifying said token generator when said access to said remote device has terminated.

25. The access control method according to claim 24, further comprising the step of authenticating said user upon notifying said token generator of said termination.

26. A centralized token generator for restricting access to a remote device on a communications network, comprising:

an input for receiving a challenge issued by the remote device from a remote user attempting to access said remote device;

a processor for calculating a token if said remote user is authorized to access said remote device; and an output for transmitting said token to the remote user, said token being used by said remote user as a response to the challenge to obtain access to the remote device.

27. The token generator according to claim 26, wherein the challenge is a random number, the remote device has an associated secret key, and the token is calculated by encrypting said first challenge with the key of said remote device.

28. The token generator according to claim 26, wherein said token generator is centralized.

29. The token generator according to claim 26, wherein said processor creates a log entry identifying said access to said remote device.

30. The token generator according to claim 29, wherein said log entry identifies said user and said remote device.

31. The token generator according to claim 29, wherein said log entry identifies the reason for said access to said remote device.

32. The token generator according to claim 29, wherein said log entry identifies the duration of said access to said remote device.

33. The token generator according to claim 26, further comprising an input for receiving a notification when said access to said remote device has terminated.

34. The token generator according to claim 33, wherein said processor authenticates said user upon receiving said notification of said termination.

35. The token generator according to claim 26, wherein said processor determines that user is authorized to access said remote device by transmitting a second challenge to said user and receiving a response to said second challenge.

36. The token generator according to claim 35, wherein the second challenge is a random number, the user has an associated secret key, and the response to the second challenge is calculated by encrypting said second challenge with the key of said user.

* * * * *